United States Patent
Roh et al.

(10) Patent No.: US 7,581,018 B2
(45) Date of Patent: Aug. 25, 2009

(54) SERVER SYSTEM FOR PERFORMING COMMUNICATION OVER WIRELESS NETWORK

(75) Inventors: Young Hoon Roh, Seoul (KR); Jung Ho Kim, Seoul (KR); Jin Cheol Cho, Seoul (KR); Jae Won Chang, Seoul (KR); Sang Hyuk Kang, Pusan (KR); Sang Mahn Kim, Kyunggi-do (KR); Pan Su Kim, Kyunggi-do (KR); Kwang Hui Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 1109 days.

(21) Appl. No.: 10/896,843

(22) Filed: Jul. 23, 2004

(65) Prior Publication Data

US 2005/0080929 A1 Apr. 14, 2005

(30) Foreign Application Priority Data

Oct. 13, 2003 (KR) ...................... 10-2003-0071134

(51) Int. Cl.
*G06F 15/16* (2006.01)
(52) U.S. Cl. ...................................... 709/232; 709/246
(58) Field of Classification Search ................. 709/223, 709/226, 236, 246, 247, 232
See application file for complete search history.

(56) References Cited

U.S. PATENT DOCUMENTS 5,881,245 A 3/1999 Thompson

| | | | |
|---|---|---|---|
| 6,249,756 B1 | 6/2001 | Bunton et al. | |
| 2002/0091849 A1 | 7/2002 | Heo | |
| 2003/0152057 A1* | 8/2003 | Chou et al. | 370/338 |

FOREIGN PATENT DOCUMENTS

| | | |
|---|---|---|
| CN | 1353524 | 6/2002 |
| GB | 2331678 | 5/1999 |

OTHER PUBLICATIONS

U.S. Appl. No. 10/896,847, filed Jul. 23, 2004.
U.S. Appl. No. 10/896,848, filed Jul. 23, 2004.
U.S. Appl. No. 10/896,990, filed Jul. 23, 2004.
English Language Abstract of CN 1353524.

* cited by examiner

*Primary Examiner*—Paul H Kang
(74) *Attorney, Agent, or Firm*—Birch, Stewart, Kolasch & Birch, LLP

(57) ABSTRACT

Disclosed is a server system for performing communication over a wireless network. At least one client device transmits and receives data over the wireless network. A server device performs a state monitoring or controlling operation for the at least one client device. In the server device, an encoder compresses and encodes data to be transmitted that includes a double buffer storing the encoded data. A network renderer transmits the data encoded by the encoder to a corresponding client device over the wireless network. A buffer manager detects an overflow of the buffer storing the data encoded by the encoder and issues a control signal for pausing an encoding operation when the overflow is detected. Therefore, the server system can avoid data loss and system shutdown caused by transmission delay and can ensure stability of the server system performing communication with a wireless network.

12 Claims, 5 Drawing Sheets

SERVER SYSTEM FOR PERFORMING COMMUNICATION OVER WIRELESS NETWORK

BACKGROUND OF THE INVENTION

1. Field of the Invention

The present invention relates to a server system for performing communication over a wireless network, and more particularly to a server system for performing communication over a wireless network that comprises a server device with a buffer manager capable of automatically pausing an encoding operation when data is stored outside a predetermined memory area to avoid transmission delay at the server device transmitting predetermined data to a client device and an overflow of data due to the transmission delay.

2. Description of the Related Art

Conventionally, a server system for performing communication over a wireless network includes one or more client devices 20 and a server device 10 for carrying out wireless communication with each client device 20 and carrying out a control operation. A wireless network modem is mounted in the server device 10 and the client device 20.

FIG. 1 is a block diagram illustrating a conventional server system for performing communication over a wireless network. Conventional drawbacks will be described with reference to FIG. 1.

The server device 10 coupled to an external medium such as a radio, a television (TV) antenna or etc. can receive moving picture data. Moreover, the server device 10 coupled to a cable network or an Internet network can receive digital contents transmitted from a specific server.

In case where video or speech signals are converted into digital data and the digital data is stored without being compressed, the uncompressed digital data occupies a large storage space of a memory provided in the server device 10 and the wireless network is unstable. Consequently, transmission load on the wireless network increases.

If the client device 20 makes a request for predetermined data transmission, the server device 10 and the client device 20 initiate wireless communication. A distance between the portable client device 20 and the server device 10 can vary when the portable client device 20 such as the web pad is moved during the wireless communication. Alternatively, frequency interference and radiowave impairment can be caused by a predetermined mobile terminal (e.g., a mobile phone, a wireless phone, a radio or etc.) that performs radiowave communication. In this case, transmission bandwidth of the wireless network is reduced and hence data transmission delay occurs. That is, the wireless network can easily be unstable because the number of communication interference parameters is large in the wireless network as compared with a wired network.

As described above, when the data transmission, delay occurs, a buffer provided in the server device 10 overflows, the buffer overflow can bring server system shutdown, and data cannot be identified in real time because of playback delay at the client device 20. For this reason, the stability of a total client-server system performing wireless communication can be degraded.

This problem can be maximized when the data transmitted from the server device 10 is streaming data such as real-time audio on demand (AOD) or video on demand (VOD).

FIG. 2 shows layer architecture for a server device and a client device. An application program is started in an application layer for controlling each device. Media access control (MAC) layers allow a plurality of client devices to share the server device, and are lower layers between the server device 10 and the client device 20.

That is, an encoder 11 encodes data to be transmitted to the client device 20 in response to a control signal issued from the application layer. The encoded data is transmitted to the client device 20 through a network renderer 12, i.e., a wireless network modem in a wireless fashion.

If data congestion is caused by wireless network variation, a bottleneck occurs in the MAC layer, the network renderer 12 and the encoder 11 in this order. As the bottleneck is continued, data in a buffer of the encoder 11 is congested and a system is stopped, such that the system can be unstable.

SUMMARY OF THE INVENTION

Therefore, the present invention has been made in view of the above problems, and it is one object of the present invention to provide a server system for performing communication over a wireless network that can avoid transmission delay caused by wireless network variation, a buffer overflow and server system shutdown by implementing a buffer manager capable of automatically pausing an encoding operation when data is stored outside a predetermined memory area in a server device transmitting predetermined data to a client device.

It is another object of the present invention to provide a server system for performing communication over a wireless network that can ensure stability of the server system when the wireless network fails, that can avoid playback delay at a client device, and that enables the client device to identify data in real time.

In accordance with one aspect of the present invention, the above and other objects can be accomplished by the provision of a server system for performing communication over a wireless network, comprising: at least one client device for transmitting and receiving data over the wireless network; and a server device for performing a state monitoring or controlling operation for the at least one client device, wherein the server device comprises: an encoder for compressing and encoding data to be transmitted that includes a double buffer storing the encoded data; a network renderer for transmitting the data encoded by the encoder to a corresponding client device over the wireless network; and a buffer manager for detecting an overflow of the buffer storing the data encoded by the encoder and issuing a control signal for pausing an encoding operation when the overflow is detected.

In accordance with another aspect of the present invention, the above and other objects can be accomplished by the provision of an operating method of a server system, comprising: (a) compressing and encoding, by an encoder, data to be transmitted, to store the encoded data in a double buffer; (b) detecting a position of a memory pointer of the double buffer and determining whether or not a buffer overflow has occurred; and (c) if the buffer overflow has occurred, generating a control signal to pause a data compression operation of the encoder and transmitting the generated control signal.

The server device acts as a device capable of controlling or monitoring at least one client device coupled thereto over a network constructed within a home, and transmits predetermined data received over the Internet, an antenna or a cable network or transmits predetermined data provided in a database to the client device in a wireless fashion.

The client device performs data communication with the server device in the wireless fashion, transmits a control signal for a real-time streaming data request, and receives data transmitted in the wireless fashion from the server device to reproduce the received data.

Preferably, the encoder of the server device comprises: the double buffer for storing data after the data compression operation or the data conversion operation is carried out. Preferably, the double buffer comprises: at least one allowable memory area for primarily storing data, the allowable memory area being used as a reference when the buffer overflow is determined; and at least one stable memory area capable of being extended to a maximum memory area so that a buffer stabilization operation can be carried out by the buffer manager when data is stored outside the allowable memory areas.

Preferably, the buffer manager detects a position of a memory pointer to detect the overflow of the double buffer storing the data encoded by the encoder and issues a control signal to control an operation of the encoder according to a position of the memory pointer.

Moreover, the network renderer provided in the server device transmits the encoded data to a corresponding client device using a Bluetooth or wireless local area network (LAN) communication protocol in the wireless fashion. Preferably, the network renderer is a network modem for receiving a request signal or a control signal from the client device. The network modem can be differently applied according to a communication protocol. The present invention is not limited to the above description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a server system for performing communication over a wireless network in accordance with preferred embodiments of the present invention will be described in detail with reference to the annexed drawings.

The server system in accordance with the present invention can be implemented by various embodiments. Hereinafter, the best embodiments will be described. Because basic components of the inventive server system are the same as the conventional components, the identical components will not be described in detail.

Figure 1:
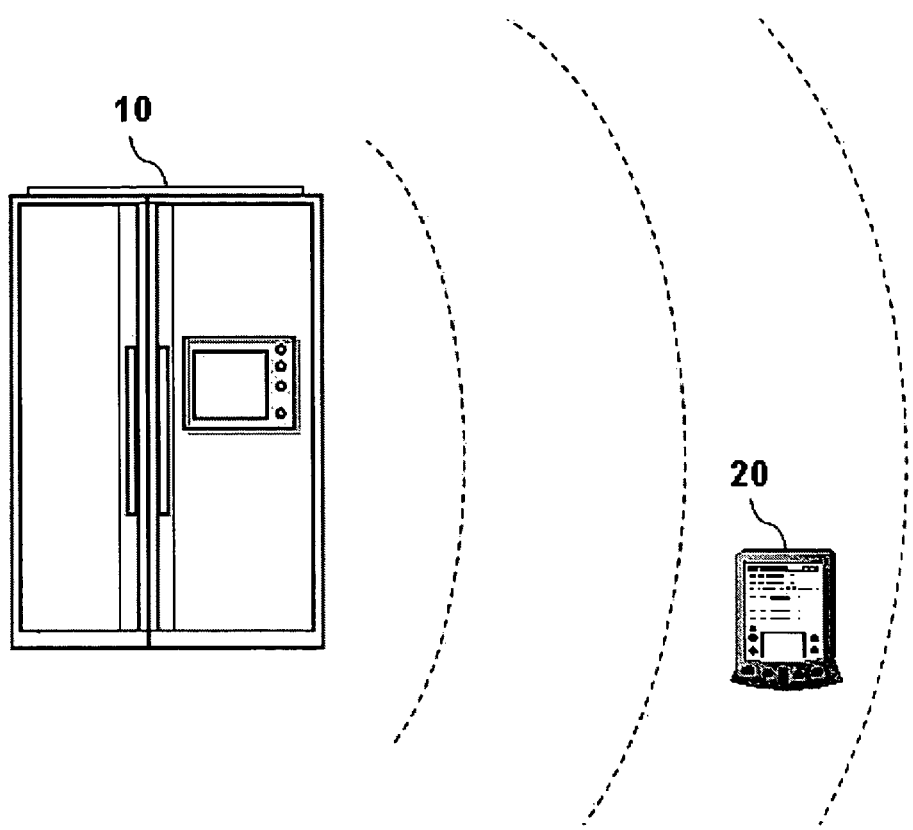
FIG. 1 shows a conventional server system for performing communication over a wireless network.
Figure 2:
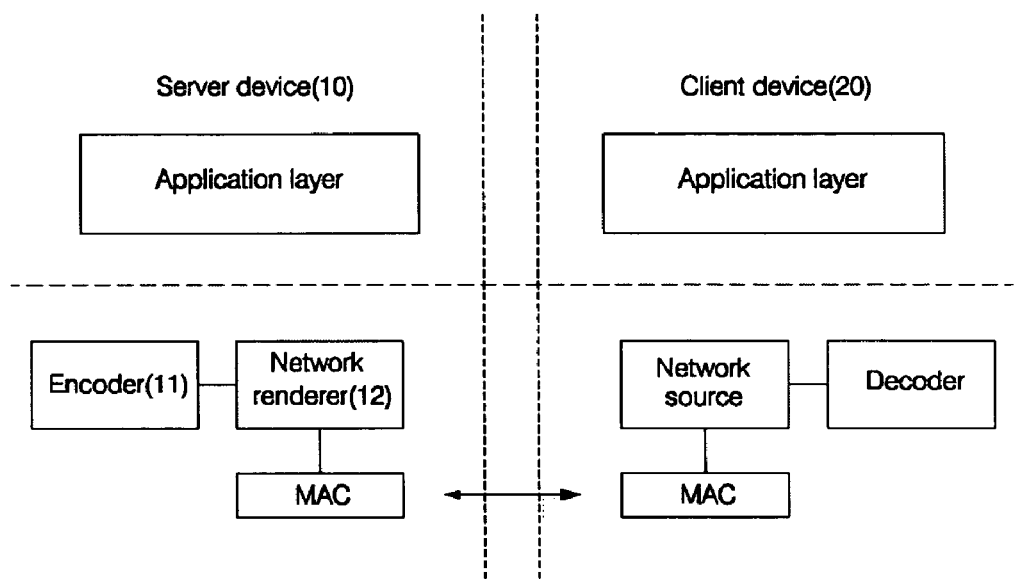
FIG. 2 shows conventional layer architecture for the server system for performing communication over the wireless network.
Figure 3:
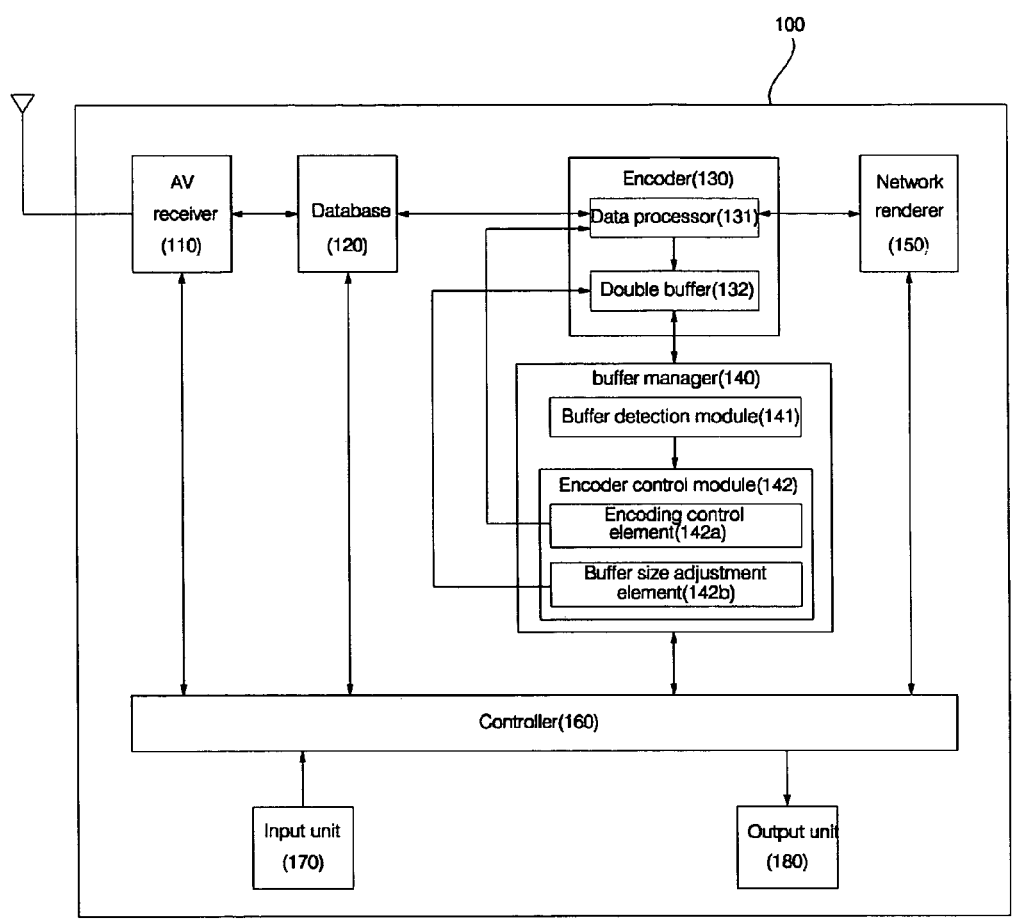
FIG. 3 is a block diagram illustrating a server device in accordance with the present invention.
Figure 4:
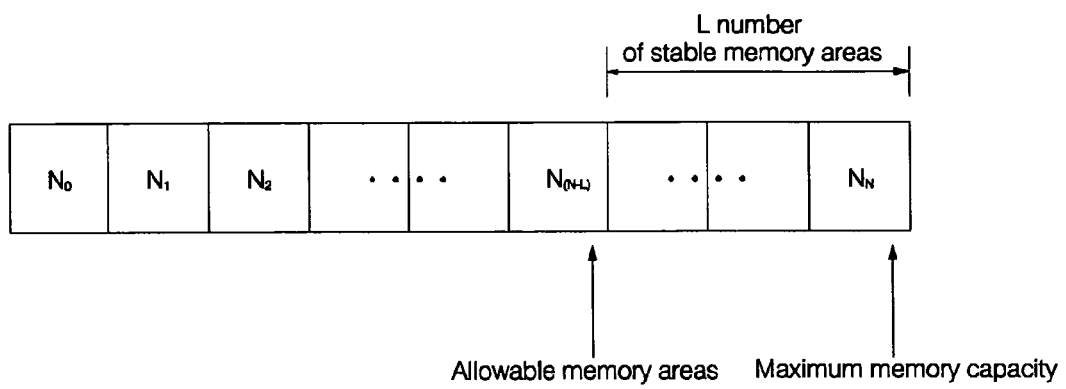
FIG. 4 shows the format of a memory area of a buffer in accordance with the present invention.

FIG. 3 is a block diagram illustrating a server device in accordance with the present invention; and FIG. 4 shows the format of a memory area of a buffer in accordance with the present invention.

A server device 100 acts as a device capable of controlling or monitoring at least one client device coupled thereto over a network constructed within a home. This embodiment exemplarily defines the server device as an Internet-based refrigerator. The server device can perform data communication with each client device in a wired or wireless fashion. However, it is assumed that data is transmitted and received in the wireless fashion in accordance with this embodiment.

As the client device performs data communication with the server device 100 in the wireless fashion, it transmits a control signal used for a real-time streaming data request to the server device 100. For example, a portable web pad capable of being attached to or separated from the Internet-based refrigerator is used in this embodiment.

The portable web pad can communicate with the Internet-based refrigerator in the wireless fashion within a predetermined radius, and has different transmission bandwidth according to an access radius. That is, as the web pad is closer to the Internet-based refrigerator, the transmission bandwidth increases and hence the transmission rate rises. On the other hand, as the web pad is farther from the Internet-based refrigerator, the transmission bandwidth is reduced and hence the transmission rate is lowered.

A wireless network modem can be mounted in the server device and the client device for the wireless communication, and is referred to as a network renderer 150.

In this case, the network renderers 150 can employ a different network modem according to a communication protocol of data transmitted and received in the wireless fashion. Typically, a Bluetooth communication module for transmitting and receiving data using the Bluetooth communication protocol or a wireless local area network (LAN) communication module for transmitting and receiving data using the wireless LAN communication protocol can be applied to the network renderer 150.

As shown in FIG. 3, the server device 100 in accordance with the present invention comprises an encoder 130 for compressing and encoding data to be transmitted that includes a double buffer 132 storing the encoded data; the network renderer 150 for transmitting the data encoded by the encoder 130 to a corresponding client device over the wireless network; and a buffer manager 140 for detecting an overflow of the buffer 132 storing the data encoded by the encoder 130 and issuing a control signal for pausing an encoding operation when the overflow is detected.

Moreover, the server device 100 further comprises: an audio/video (AV) receiver 110 for receiving a moving picture data stream transmitted over an external cable antenna or an Internet network; a database 120 for storing the received moving picture data stream; and a controller 160 for controlling flow of data and control signal in the server device 100.

The server device 100 further comprises: an input unit 170 for receiving a control command for monitoring a state of the server device 100 or controlling an operation of the server device 100; and an output unit 180 for identifying a result of the operation control for a corresponding client device and a state of data transmission over the wireless network. The input device 170 and the output device 180 are interfaced with a user.

The double buffer 132 of the encoder 130 in accordance with the present invention is provided to avoid loss of the encoded data caused by insufficient transmission bandwidth of the wireless network.

The encoder 130 comprises: a data processor 131 for carrying out a data compression operation or a data conversion operation based on a communication protocol; and the double buffer 132 for storing data after the data compression operation or the data conversion operation is carried out. A memory area of the double buffer 132 is shown in FIG. 4.

The double buffer 132 shown in FIG. 4 is divided into (N−L+1) number of allowable memory areas for primarily storing data and being used as a reference when the buffer overflow is determined, and L number of stable memory areas capable of being extended to a maximum memory area $N_N$ so that a buffer stabilization operation can be carried out by the buffer manager 140 when data is stored outside the allowable memory areas.

Here, the buffer manager 140 comprises: a buffer detection module 141 for detecting a position of a memory pointer to detect the overflow of the double buffer 132 storing the data encoded by the encoder 130; and an encoder control module 142 for generating a control signal to control an operation of the encoder 130 according to a position of the memory pointer.

The encoder control module 142 comprises: an encoding control element 142a for pausing an encoding operation when the memory pointer pointing to a memory area of the double buffer 132 points to a predetermined memory area outside the allowable memory areas, that is, a stable memory area, and generating a control signal for resuming the encoding operation when the buffer 132 is cleared; and a buffer size adjustment element 142b for adjusting a size of the allowable memory areas of the buffer 132.

Thus, the buffer manager 140 can avoid data congestion caused by a failed wireless network and server system shutdown caused by a buffer overflow. Moreover, the buffer manager 140 can reduce transmission load by pausing data transfer to the network renderer 150 and hence solve the bottleneck phenomenon of data transmission.

Figure 5:
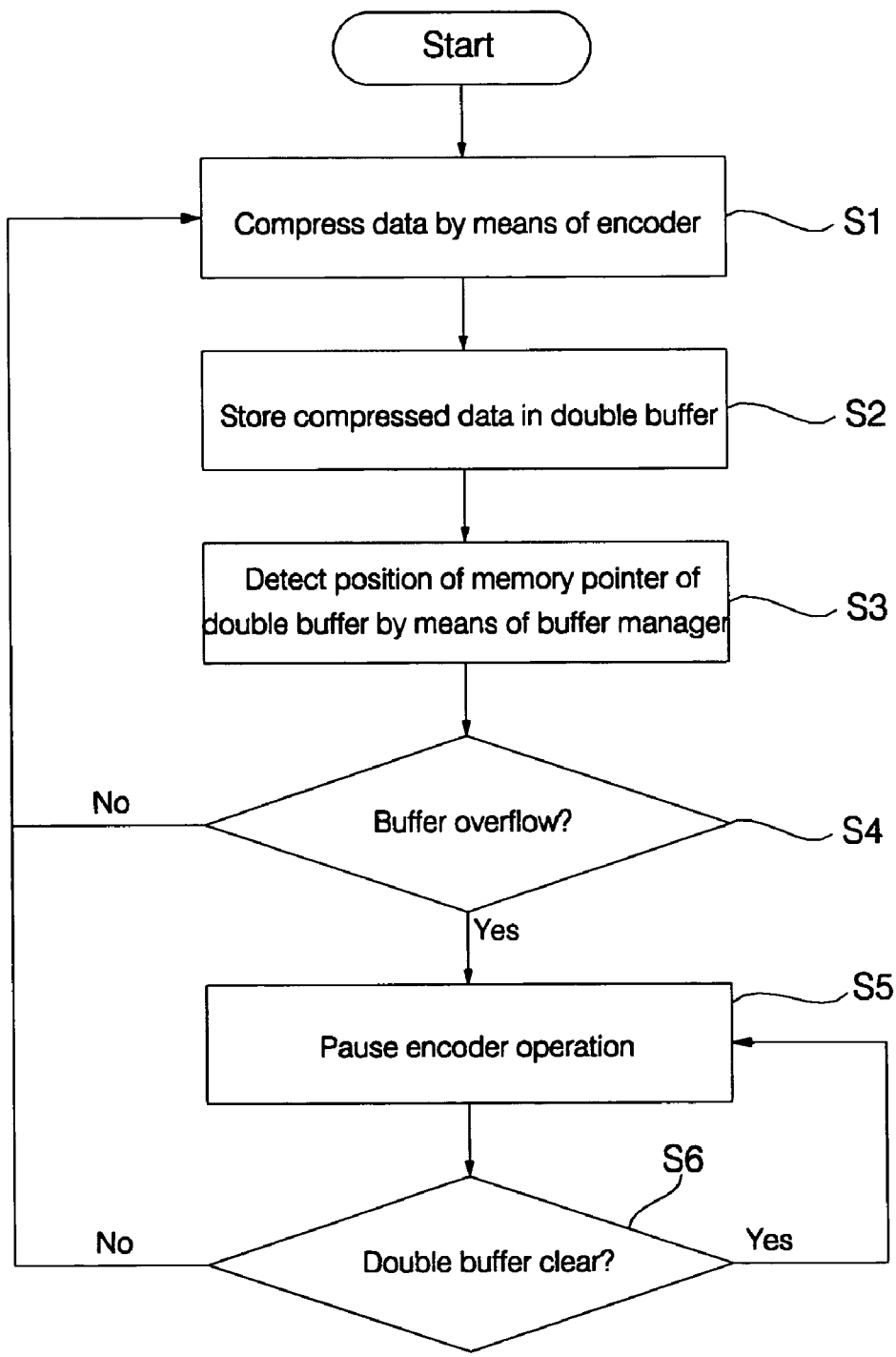
FIG. 5 is a flowchart illustrating an operating method of the server system for performing communication over the wireless network in accordance with the present invention.

The operating method of the server system constituted as described above will be described with reference to FIG. 5.

First, the encoder compresses data to be transmitted according to a request of the client device or a control command inputted through the input unit of the server device, and stores the encoded data in the double buffer (S1 and S2).

The buffer manager of the server device detects the position of a memory pointer of the double buffer and checks for a buffer overflow (S3 and S4).

If the data stored in the buffer is present within allowable memory areas, the data is transmitted to the client device and an encoding operation for the remaining data is continued. Otherwise, if it is determined that the buffer data is present outside the allowable memory areas and the buffer overflow has occurred, the encoding operation is paused (S5).

In this case, the size of allowable memory areas of the double buffer can be adjusted by a manager or can be automatically adjusted by a server controller, such that encoding/transmission load can be controlled. For example, when the size of allowable memory areas is reduced, a determination operation for the buffer overflow is frequently carried out and an encoding rate is lowered, such that data transmission load can be reduced.

When the double buffer is cleared after the encoding operation has been paused, the encoding operation is resumed normally (S6).

As apparent from the above description, a server system in accordance with the present invention implements a buffer manager capable of detecting a buffer area of an encoder in a server device performing communication with at least one client device, thereby avoiding a buffer overflow in advance, solving data congestion in a network renderer, avoiding system shutdown caused by the buffer overflow, and ensuring stability of the server system when a wireless network fails.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Patent Application No. 10-2003-0071134, filed on Oct. 13, 2003, the contents of which are herein expressly incorporated by reference in its entirety.

What is claimed is:

1. A server system for performing communication over a wireless network, comprising:
at least one client device that transmits and receives data over the wireless network; and
a server device that performs at least one of a state monitoring and a controlling operation for the at least one client device,
wherein the server device comprises:
an encoder that compresses and encodes data to be transmitted, the encoder including a double buffer that stores the encoded data;
a network renderer that transmits the data encoded by the encoder to a corresponding client device over the wireless network; and
a buffer manager that detects an overflow of the double buffer and issues a control signal to pause an encoding operation when the overflow is detected.

2. The server system according to claim 1, wherein the server device further comprises:
an audio/video (AV) receiver that receives a moving picture data stream transmitted over one of an external cable antenna and an Internet network;
a database that stores the received moving picture data stream; and
a controller that controls a flow of data and the control signal in the server device.

3. The server system according to claim 1, wherein the encoder comprises:
a data processor that performs at least one of a data compression operation and a data conversion operation based on a communication protocol; and
the double buffer that stores at least one of compressed data and converted data.

4. The server system according to claim 1, wherein the double buffer comprises:
at least one allowable memory area that stores data, the allowable memory area being used as a reference when the buffer overflow is determined; and
at least one stable memory area capable of being extended to a maximum memory area when a buffer stabilization operation is performed by the buffer manager when data is stored outside the at least one allowable memory area.

5. The server system according to claim 1, wherein the buffer manager comprises:
a buffer detection module that detects a position of a memory pointer to detect the overflow of the double buffer storing the encoded data; and
an encoder control module that generates the control signal to control an operation of the encoder according to a position of the memory pointer.

6. The server system according to claim 5, wherein the encoder control module comprises:
an encoding control module that pauses the encoding operation when the memory pointer points to a predetermined memory area outside the at least one allowable memory area, and generating a control signal that resumes the encoding operation when the buffer is cleared; and a buffer size adjustment module that adjusts a size of the at least one allowable memory area of the buffer.

7. The server system according to claim 6, wherein the server device further comprises:
an input unit that receives a control command for at least one of monitoring a state of the server device and controlling an operation of the server device; and
an output unit that outputs a result of the operation for a corresponding client device.

8. The server system according to claim 1, wherein the network renderer comprises a Bluetooth communication module that transmits and receives data using a Bluetooth communication protocol.

9. The server system according to claim 1, wherein the network renderer comprises a wireless local area network (LAN) communication module that transmits and receives data using a wireless LAN communication protocol.

10. An operating method of a server system for performing communication over a wireless network, the server system comprising at least one client device that transmits and receives data over the wireless network, and a server device that performs a state monitoring or controlling operation for the at least one client device, the operating method comprising:
compressing and encoding, by an encoder, data to be transmitted, to store the encoded data in a double buffer;
detecting a position of a memory pointer of the double buffer and determining whether there is a buffer overflow; and
generating a control signal to pause a data compression operation of the encoder, and transmitting the generated control signal, when there is buffer overflow.

11. The operating method according to claim 10, wherein generating a control signal comprises:
resuming the compressing and the encoding after the double buffer is cleared.

12. The operating method according to claim 10, wherein generating a control signal comprises:
adjusting a size of at least one allowable memory area of the double buffer.

* * * * *